US008081745B2

(12) United States Patent
Burrell et al.

(10) Patent No.: US 8,081,745 B2
(45) Date of Patent: Dec. 20, 2011

(54) DYNAMIC INFORMATION PUBLICATION ENABLING DIRECT ACCESS TO A PREFERRED COMMUNICATION CHANNEL CONNECTION IN INTEGRATED COMMUNICATION SERVER

(75) Inventors: Mark Burrell, Hamden, CT (US);
Joseph Fletcher, Seattle, WA (US);
Justin Maguire, III, Seattle, WA (US);
Mickey Monaghan, Issaquah, WA (US);
Thomas Bouchard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1321 days.

(21) Appl. No.: 11/611,091

(22) Filed: Dec. 14, 2006

(65) Prior Publication Data

US 2008/0148154 A1   Jun. 19, 2008

(51) Int. Cl.
*H04M 3/42* (2006.01)
(52) U.S. Cl. ............ 379/201.1; 379/207.12; 379/265.01; 379/265.09
(58) Field of Classification Search ................ 379/201.1, 379/142.07, 265.01–266.1, 245, 207.12, 379/93.01–93.09; 455/456.1; 709/204–238
See application file for complete search history.

(56) References Cited

U.S. PATENT DOCUMENTS

| 5,689,642 | A | 11/1997 | Harkins et al. |
| 5,812,865 | A | 9/1998 | Theimer et al. |
| 6,263,064 | B1 | 7/2001 | O'Neal et al. |
| 6,477,240 | B1 | 11/2002 | Lim et al. |
| 6,564,261 | B1 | 5/2003 | Gudjonsson et al. |
| 6,782,079 | B2 | 8/2004 | Skladman et al. |
| 6,988,132 | B2 | 1/2006 | Horvitz |
| 7,024,209 | B1 | 4/2006 | Gress et al. |
| 7,483,525 | B2 * | 1/2009 | Chaddha et al. ......... 379/142.07 |
| 7,571,249 | B2 * | 8/2009 | Wu ............... 709/238 |
| 7,607,096 | B2 * | 10/2009 | Oreizy et al. ................. 715/751 |
| 7,676,550 | B1 * | 3/2010 | Jachner ......................... 709/217 |
| 7,725,548 | B2 * | 5/2010 | Ohtani et al. ................. 709/206 |
| 2002/0124057 | A1 | 9/2002 | Besprosvan |
| 2003/0174815 | A1 | 9/2003 | Didcock et al. |
| 2004/0059781 | A1 * | 3/2004 | Yoakum et al. ............... 709/204 |
| 2005/0216848 | A1 * | 9/2005 | Thompson et al. ........... 715/753 |
| 2007/0027702 | A1 * | 2/2007 | Cox et al. ........................... 705/1 |
| 2007/0032240 | A1 * | 2/2007 | Finnegan et al. ............. 455/445 |
| 2007/0127699 | A1 * | 6/2007 | Lenard .......................... 379/352 |
| 2007/0167136 | A1 * | 7/2007 | Groth ........................... 455/41.2 |

OTHER PUBLICATIONS

Andrews, C.R., "Unified Communications Systems," © 2004 ACM, *Crossroads, the ACM Student Magazine*, pp. 1-11, <http://www.acm.org/crossroads/xrds8-1/ucs.html> [retrieved Sep. 22, 2006].

(Continued)

*Primary Examiner* — William Deane, Jr.
(74) *Attorney, Agent, or Firm* — Merchant & Gould

(57) ABSTRACT

The method and system guides a user to easily and effectively communicate with a potential recipient via an integrated communication server. The integrated communication server will track and aggregate user presence information about the potential recipient. The aggregated user presence information includes the current state, activity, and/or availability of the potential recipient. The integrated communication server dynamically analyzes and compares the aggregated user presence information with user preference information of the potential recipient in order to identify an appropriate communication method. The identified appropriate communication method is published to the user indicating that it has a great likelihood of reaching the potential recipient successfully in the right way at the right time.

20 Claims, 9 Drawing Sheets

OTHER PUBLICATIONS

Maniatis, P., et al., "The Mobile People Architecture," *Mobile Computing and Communications Review*, 3(3):36-42, Proceedings of the USENIX Symposium on Internet Technologies and Systems, Oct. 1999, <http://www.stanford.edu/class/cs444n.html> [retrieved Feb. 23, 2007].

Marmasse, N., "Providing Lightweight Telepresence in Mobile Communication to Enhance Collaborative Living," Doctoral dissertation © 2004 *MIT*, pp. 1-124, <http://www.pubs.media.mit.edu/pubs/papers/Marmasse.pdf.html> [retrieved Feb. 22, 2007].

* cited by examiner

DYNAMIC INFORMATION PUBLICATION ENABLING DIRECT ACCESS TO A PREFERRED COMMUNICATION CHANNEL CONNECTION IN INTEGRATED COMMUNICATION SERVER

BACKGROUND

In recent years, there has been an increasing convergence and integration in communications technologies as reflected in devices and applications that enable multiple modes of communications across a wide range of devices, channels, and modalities. One example may be an integrated communicator application which integrates among multiple modes of real time communication (e.g., e-mail, phone, Instant Message (IM), Short Message Service (SMS)). The advantages of integrating multiple mode real time communication are numerous. In one embodiment, users may be provided with the ability to select a desired mode of communication based on the situation at hand. For example, a user can choose a voice communication among other modes for communicating with a friend while the user can choose an e-mail communication across the Internet for communicating with a coworker using one device.

As many devices are now capable of enabling multiple modes of communications via a wide range of communication channel options, users face new problems of having too many choices/options to consider. Moreover, with a conventional integrated communicator application, a user may have to make a quick decision to choose from a wide array of communications methods (device, channel, modality, etc.), with little or no information about the likelihood of reaching a recipient party successfully. It is especially true when a user wants to communicate with a recipient party in real-time or near real-time. Further, most conventional integrated communicator applications do not provide information about the probability that a recipient party will be able and willing to respond/interact through the specific method chosen by the user. This little or no guidance as to a most appropriate method based on the recipient's availability and willingness leads a user to make a wild guess or attempt several communications until the user finally reaches the recipient party.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for publishing user presence information with which a user can assess the most appropriate and/or preferred communication method of a recipient party at a particular point in time is provided. More specifically, the method and system guides a user to select an easy and effective communication method for a communication with a potential recipient, such as colleagues, customers and partners in real time via an integrated communication server. The integrated communication server will track and aggregate user presence information about the potential recipient specified by a user. The aggregated user presence information includes the current state, activity, and/or availability of the recipient. The aggregated user presence information will be analyzed and compared with user preference information of the potential recipient in order to dynamically identify an appropriate communication method at a point in time for the potential recipient. The user can initiate a communication via the identified appropriate communication channel or method with a great likelihood of reaching the potential recipient successfully (in the right way at the right time).

In accordance with an aspect of the present invention, a method for dynamically publishing presence information about a group of recipient parties to a sending party is provided. The method includes dynamically obtaining presence information about a recipient party and processing the obtained presence information in combination with the recipient party's communication preferences in order to determine and provide direct access to the most effective communication channel at a point in time for a specific recipient. According to the processed information, a presence information publication including an appropriate communication channel choice to initiate a communication between a sending party and the recipient party is generated. The presence and communication channel information is presented to the sending party. The recipient party is tracked to detect any changes in the presence information and the presence information publication is dynamically updated to reflect the detected change. In addition, the appropriate choice with a highest level of likelihood of communicating with the recipient party is determined and suggested to the sending party as part of the presence information publication.

In accordance with another aspect of the present invention, a computer-readable medium having computer-executable components for assisting a user to determine an appropriate communication modality for communicating with a recipient is provided. The computer-readable medium includes a storage component, a process component, a tracking component, and a user interface component.

In accordance with yet another aspect of the present invention, a method for processing user presence information to determine an appropriate communication modality is provided. The method includes collecting current state information about a user, obtaining user preference information which is specified by the user and comparing the current state and the user preference information to identify a first appropriate communication modality and corresponding device. Accessibility of the user is determined via the identified device and the first appropriate communication modality. Upon determining the accessibility of the user, another user is enabled to communicate with the user via the first appropriate communication modality and the identified device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present invention relate to a method and system for publishing preferred "communication methods" of a recipient party in conjunction with the user presence information at a particular point in time under certain circumstances. A "communication method," as used herein, refers to a choice of a device, channel, and modality. More specifically, a list of the preferred communication methods is determined and presented in the order of likelihood of successfully communicating with the recipient party.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. It should also be understood that the following description is presented largely in terms of logic operations that may be performed by conventional computer components. These computer components, which may be grouped at a single location or distributed over a storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to obscure the invention.

Figure 1:
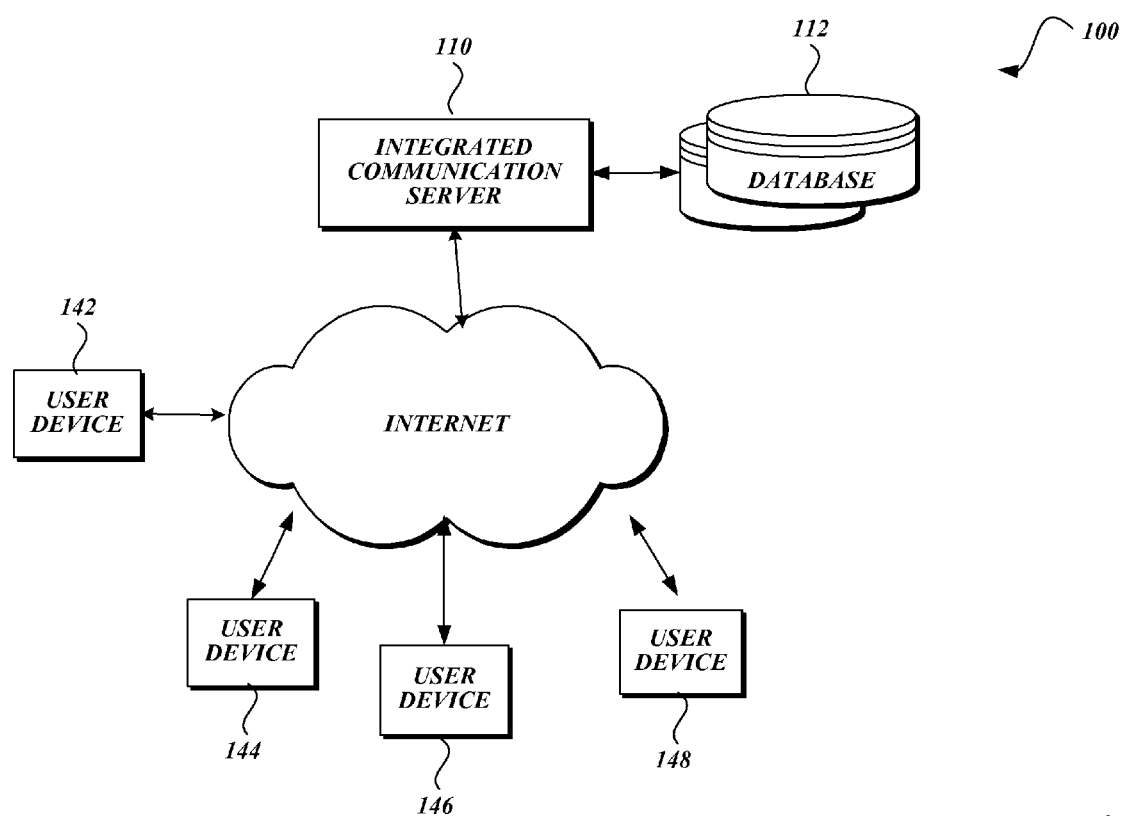
FIG. 1 is a block diagram illustrative of an exemplary networked environment suitable for integrating among multiple modes of real-time communications in accordance with an aspect of the present invention.

Referring to FIG. 1, a block diagram illustrates an exemplary networked environment 100 suitable for providing multiple modes of real-time communications to a user in accordance with an aspect of the present invention.

The exemplary networked environment 100 includes one or more user devices, such as user devices 142-148, by which a user (not shown) can establish a communication channel with others. The user devices 142-148 communicate with an integrated communication server 110 that is responsible for facilitating multimode real time communications among user devices 142-148 via a network. User devices, such as user devices 142-148, are typically computing devices including a variety of configurations or forms such as, but not limited to, laptop or tablet computers, personal computers, personal digital assistants (PDAs), hybrid PDA/mobile phones, mobile phones, wired landline phones, and the like. While illustrative embodiments have been illustrated and described, it will be appreciated that various changes can be made therein without departing from the spirit and scope of the invention.

As illustrated in FIG. 1, the integrated communication server 110 collects state and activity information (user presence information) about a user who is operating a user device 142-148. The collected user presence information may be aggregated and analyzed to assist another user to make a decision for selecting an appropriate communication method of the user. In one embodiment, the integrated communication server 110 supports various communication channels, protocols, and modalities. Examples of communication channels may include the Internet, a telephony network, Digital Subscriber Line (DSL), WiFi, Bluetooth, etc. Examples of modalities may include e-mail, voice mail, voice, phone, instant message, SMS, etc.

Those skilled in the art will appreciate that the various components depicted in FIG. 1 are illustrative only. As mentioned above, an actual embodiment of an integrated communication server 110 may be comprised of a single computer or a plurality of discrete, cooperative servers distributed in a communications network. Similarly, the identified components should be viewed as logical components as each component may be physically embodied on one or more computer systems as well as combined with other hardware and/or software components not illustrated herein.

In an illustrative embodiment, a user may be able to maintain a list of potential recipients (contacts) within the integrated communication server. The potential recipients are also users of the integrated communication server 110, with whom the user wants to communicate via various modalities. In this embodiment, the user may specify a list of the potential recipients in user preference information which is stored in a database of the integrated communication server. In an alternative embodiment, the integrated communication server 110 may look up potential recipients based on recipient criteria within the network. The recipient criteria may specify that if a name (identifier) associated with a user appears within a screen on a device of another user, the user is a potential recipient of communication from another user. Likewise, the recipient criteria may specify that if any visual indicator associated with a user appears within a screen on a device of another user, the user is a potential recipient of communication from another user. In this embodiment, the potential recipients are also users of the integrated communication server 110, with whom the user can communicate via various modalities. It is to be understood that the recipient criteria can be inferred based on the current context of the user.

Figure 2A:
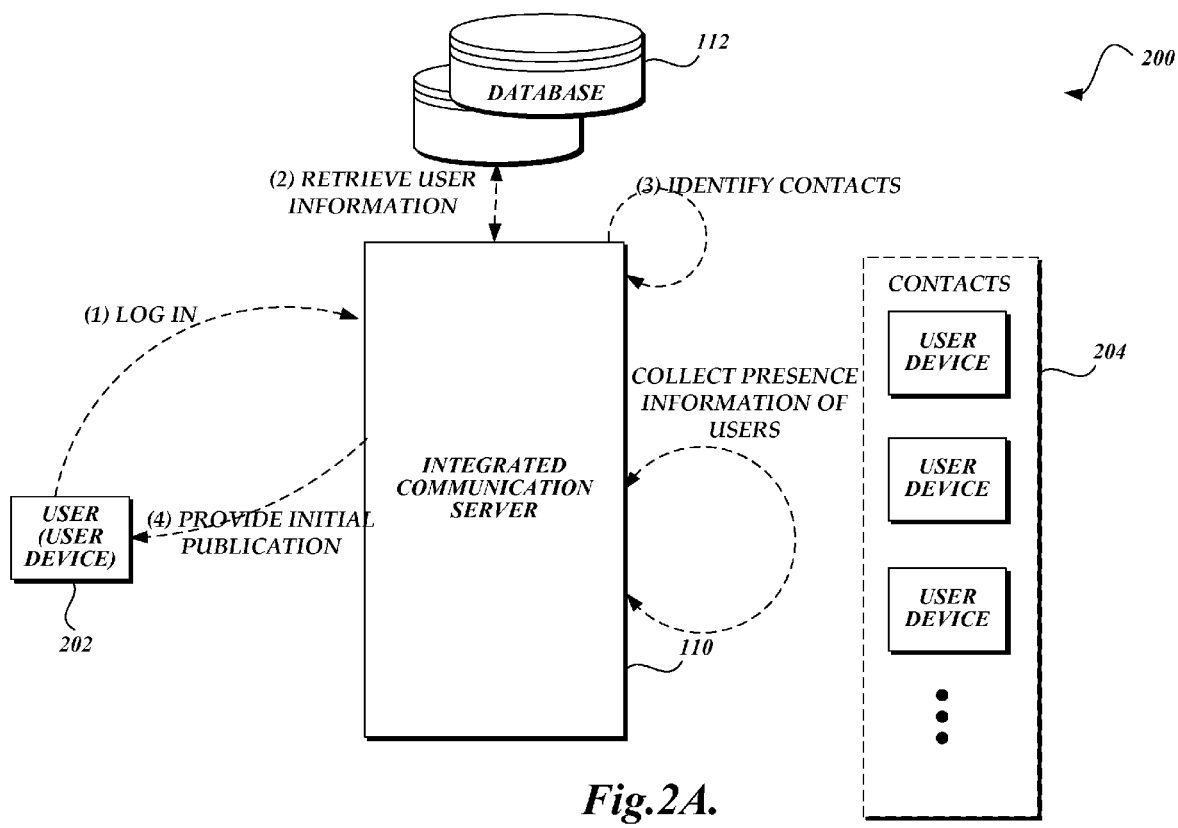
FIGS. 2A-2B are block diagrams illustrative of interactions between an integrated communication server and users in accordance with an aspect of the present invention.
Figure 2B:
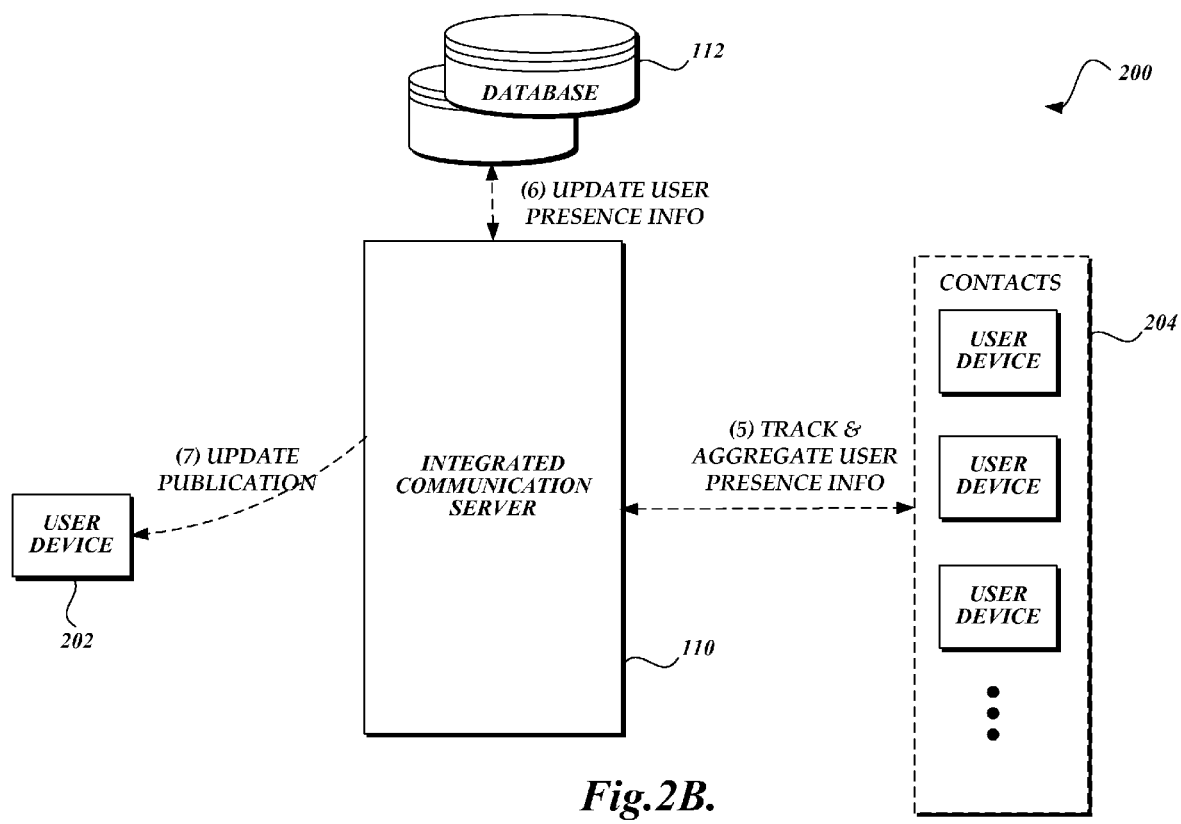

Referring to FIGS. 2A-2B, block diagrams illustrate interactions among an integrated communication server and a user when the user wants to view the user presence information of potential recipients in accordance with an aspect of the present invention.

As shown in FIG. 2A, when a user 202 first logs onto the integrated communication server 110, the user profile information corresponding to the user may be identified and retrieved from the database 112. The user profile information may be processed to identify a group of potential recipients (contacts) 204. After the group of potential recipients 204 are identified, the integrated communication server 110 obtains presence information about each potential recipient. For example, the integrated communication server 110 may check whether a potential recipient has logged on the integrated communication server 110 and collects information about the current presence state of the potential recipient. In one embodiment, the presence state may be a combination of various information such as a machine/system state (e.g., device's state, user's interaction with a device, user's interaction with the integrated communication server), calendar information, user indicated state (e.g., "I am busy," "Appear Offline," "In the Meeting," etc.), and the like.

The integrated communication server 110 may obtain user preferences from the user profile information of each potential recipient. As will be discussed in greater detail below, the user profile information includes, but is not limited to, a name, a nickname, user preference, reachable (available) devices, contact information of device/modality (e.g., telephone number for a mobile phone, e-mail address for e-mail, login name for instant messenger, or the like), etc. The user preference may be one or more preferred communication methods, preferred devices, preferred modality, preferred communication channel, etc. The user preference may also include presence level information. The presence level may be determined based on the relationship with the user. The presence level may constrain what scope of the presence information can be displayed, what type of communication methods can be allowed, and under what condition. For example, a user can specify that if the user is in the meeting, a sales person does not allow viewing the user's presence information and emailing is the only available communication method to contact the user. At the same time, the user can specify that a boss can view the user's presence information and contact the user via any available communication methods while the user is at work. The integrated communication server 110 may also obtain user preference via interaction with the potential recipients 204.

The collected user presence information and the user preferences may be analyzed to generate a publication of presence information which will be displayed on a user's device. The publication of presence information of the potential recipients 204 (publication of presence information) is then presented to assist the user 202 to make a decision for an appropriate communication method for each potential recipient. For example, the publication of presence information may provide the user presence information of each potential recipient, an appropriate or preferred communication method, other information relevant for the user to establish a communication with the potential recipient. Referring to FIG. 2B, the integrated communication server 110 may track the presence state or activities of each potential recipient and aggregate presence information of the potential recipients. In one embodiment, the presence information of the potential recipients is continuously collected in a predetermined time and the collected information is aggregated. The integrated communication server 110 also dynamically update the current presence state information if there is any change in the activities or the current presence state of the potential recipients. Moreover, the publication of user presence information will be dynamically updated as the integrated communication server 110 detects a change in the potential recipients' presence information. For example, assume that a potential recipient has indicated a preferred method is to be contacted via a work phone. The potential recipient is now in a meeting at a different location but forgets to change his/her user preference. As the integrated communication server 110 collects different state information (from "at work" to "in a meeting"), the integrated communication server 110 may determine that the preferred method may not be appropriate in the current situation. Subsequently, the integrated communication server 110 may determine a work email as an appropriate method based on the updated state information (i.e., "in a meeting") and the user preference (i.e., work phone). Consequently, the publication of presence information is updated to reflect changes in the presence state and present a work email as an appropriate method for reaching the potential recipient. It is to be noted that the publication of presence information can be provided on a user device in any suitable form which allows a user to easily recognize the presence information of the potential recipients 204.

Figure 3:
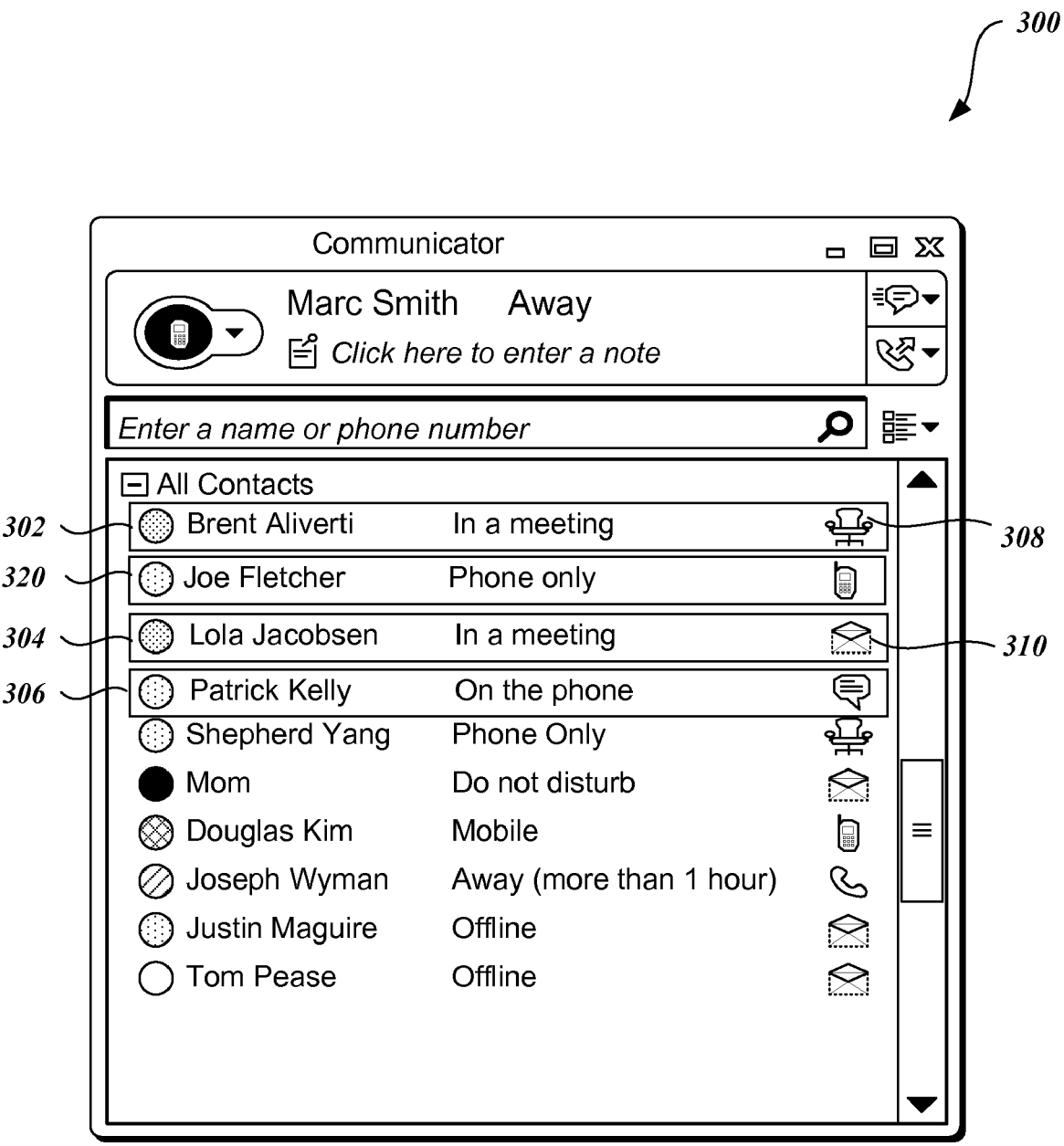
FIG. 3 is a pictorial diagram of the exemplary screen that publishes user presence information of potential recipients on a user device as a top menu in accordance with an aspect of the present invention.

Referring to FIG. 3, the publication of presence information can be provided as a form of a graphic user interface 300 displayed on a user device. In one embodiment, the publication of user presence information may have several layers of detail. Initially, the digested presence information may be presented on the top level of the menu within the graphic user interface 300. If the user wants more information than the digested presence information, the user can indicate that detailed presence information of a selected potential recipient is desired by interacting with the graphic user interface 300. For example, the graphic user interface 300 may provide a next level menu to view more detailed information about a selected potential recipient. As will be appreciated by one of ordinary skill in the art, a hyperlink or a visual indicator may also be provided for the user to view more detailed information. For example, a hyperlink associated with each potential recipient's name may point to detailed information about the potential recipient.

In an illustrative embodiment, the publication of presence information may be presented as a list of contact information 302-306 displaying key elements of presence information, including, but not limited to, an identity indicator (e.g., name), current presence state, and preferred communication method. The key elements of presence information may be determined in such a way that the user can have a general idea about each potential recipient's presence and a preferred communication method at a glance. For example, first contact information 302 and second contact information 304 indicate that a first potential recipient "Brent" and a second potential recipient "Lola" are in the same state, currently online and in the meeting. The user knows that Brent and Lola may not be able to receive a call at this moment since they are in the meeting. Further, the first contact information 302 shows a preferred method to be calling "Brent" "at work," noted by the office icon 308 while the second contact information 304 shows a preferred method of "Lola" to be contacted by "email," noted by the e-mail icon 310. Based on the top level information, the user can efficiently determine which communication method will be the most likely method (or preferred method) to communicate with the potential recipients. Third contact information 306 shows a current state of a third potential recipient "Patrick" as "On the Phone" and online, the preferred communication method is an Instant Message.

Figure 4:
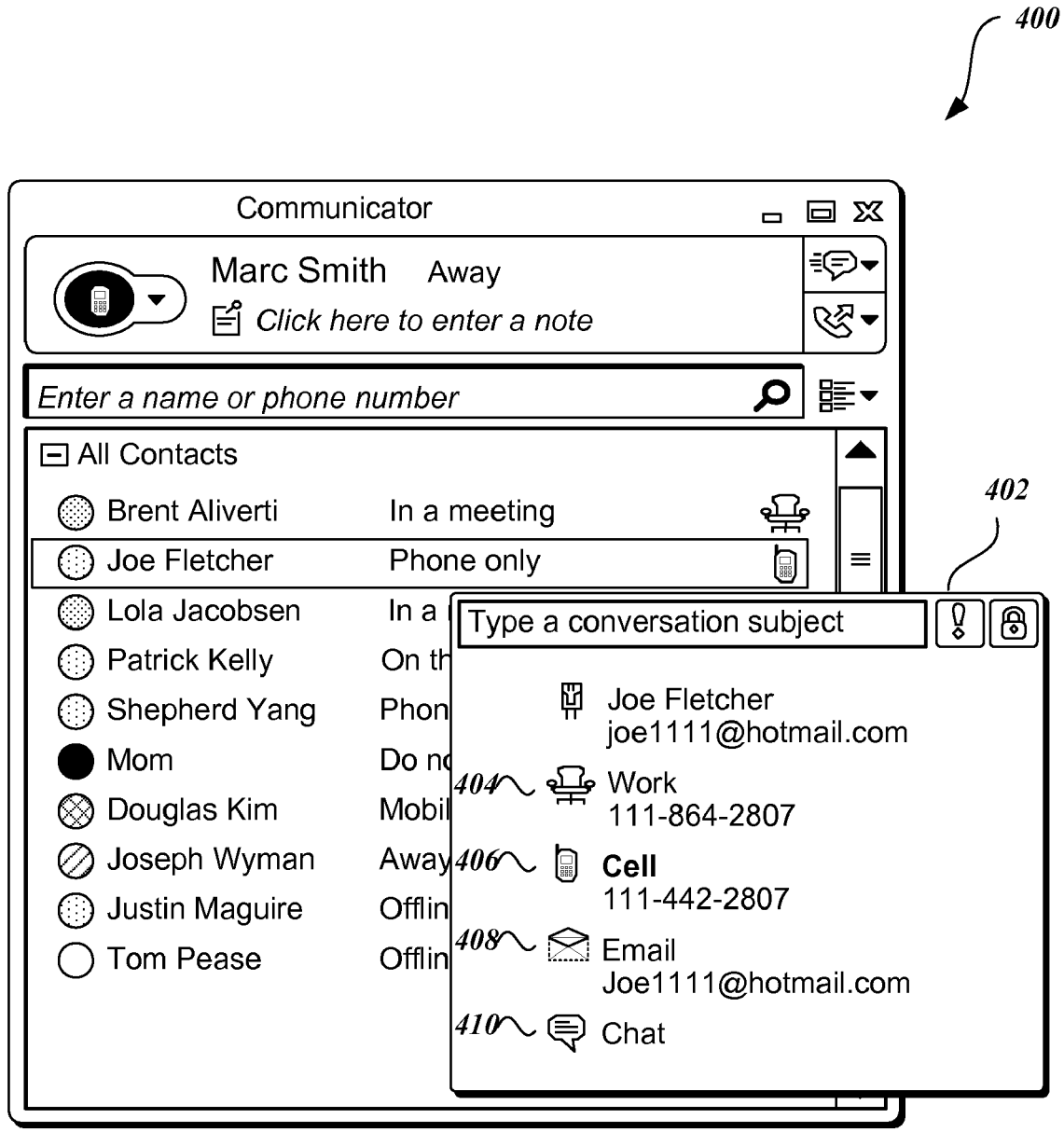
FIG. 4 is a pictorial diagram of the exemplary screen that displays detailed information of a contact selected from the top menu illustrated in FIG. 3.

It is to be understood that while each potential recipient may have specified preferred way to be contacted, a user does not have to select the preferred method for a choice of communication. A user can contact the potential recipients in additional communication methods/devices supported by the integrated communication server. For the purpose of discussion, assume that a user wants to contact Joe who has indicated his preferred method in a particular context (including presence state) is to be connected by a mobile phone. In the publication screen, the contact information 320 is corresponding to user presence information about Joe. In order to assist the user to view other ways to communicate with Joe, a detailed communication method window 402 is populated within an exemplary screen 400 as shown in FIG. 4. As discussed above, each user can specify user profile information including several communication methods which can be used to communicate with the user. In this example, Joe has specified that he can be reached by his e-mail, mobile phone, instant messenger, etc., and provided information necessary to implement (initiate) each communication method. For example, for the email communication method, his preferred e-mail address has been stored in the user profile information.

Within the detailed communication method window 402, each contact item 404-410 represents a modality (e-mail, phone call, instant message, etc.) and modality contacting information (e-mail address, phone number, etc.) associated with the modality. Within the detailed communication method window 402, a contact item corresponding to the preferred method may be visually distinguished by different fonts, highlights, icons, etc. A contact item corresponding to a currently unavailable method may be shaded out. Additionally, each contact item 404-410 is presented in the order of likelihood of reaching the recipient. As will be discussed in greater detail below, when there are several communication methods available to the user to communicate with a potential recipient, each communication method may be evaluated to determine a level of likelihood of reaching the potential recipient. The level of likelihood may be determined based on determination factors about the potential recipient. The determination factors may vary, including, but not limited to, the potential recipient's preference (e.g., communication method preference, device preference, date/time preference, location preference, etc.), functionality and availability of devices, activity of the potential recipient, current presence state of the potential recipient, server rules, organization preference, and the like. Based on the level of likelihood, an ordered list of communication methods may be generated and published to the user.

As shown in FIG. 4, several contact items 404-410 for Joe, "Work" 404, "Cell" 406, "Email" 408, and "Chat" 410 are displayed and the preferred method "Cell" 406 is displayed in bold. As discussed above, the integrated communication server 110 enables a user to activate a selected modality with a simple interaction with the integrated communication server 110. For example, the user can select any contact item from the menu window to initiate a communication with a potential recipient. Within the detailed communication method window 402, if the user clinks or double clicks on "Cell" 406, a call connection is initiated to the phone number of Joe's cell (111-442-2807).

It is to be noted that the precise flow and number of steps required to initiate communications and/or establish a connection would vary based on modality. For example, a single click could open an instant message conversation window if the user selects IM for a communication, but the user would have to then type a message and transmit the message.

Figure 5:
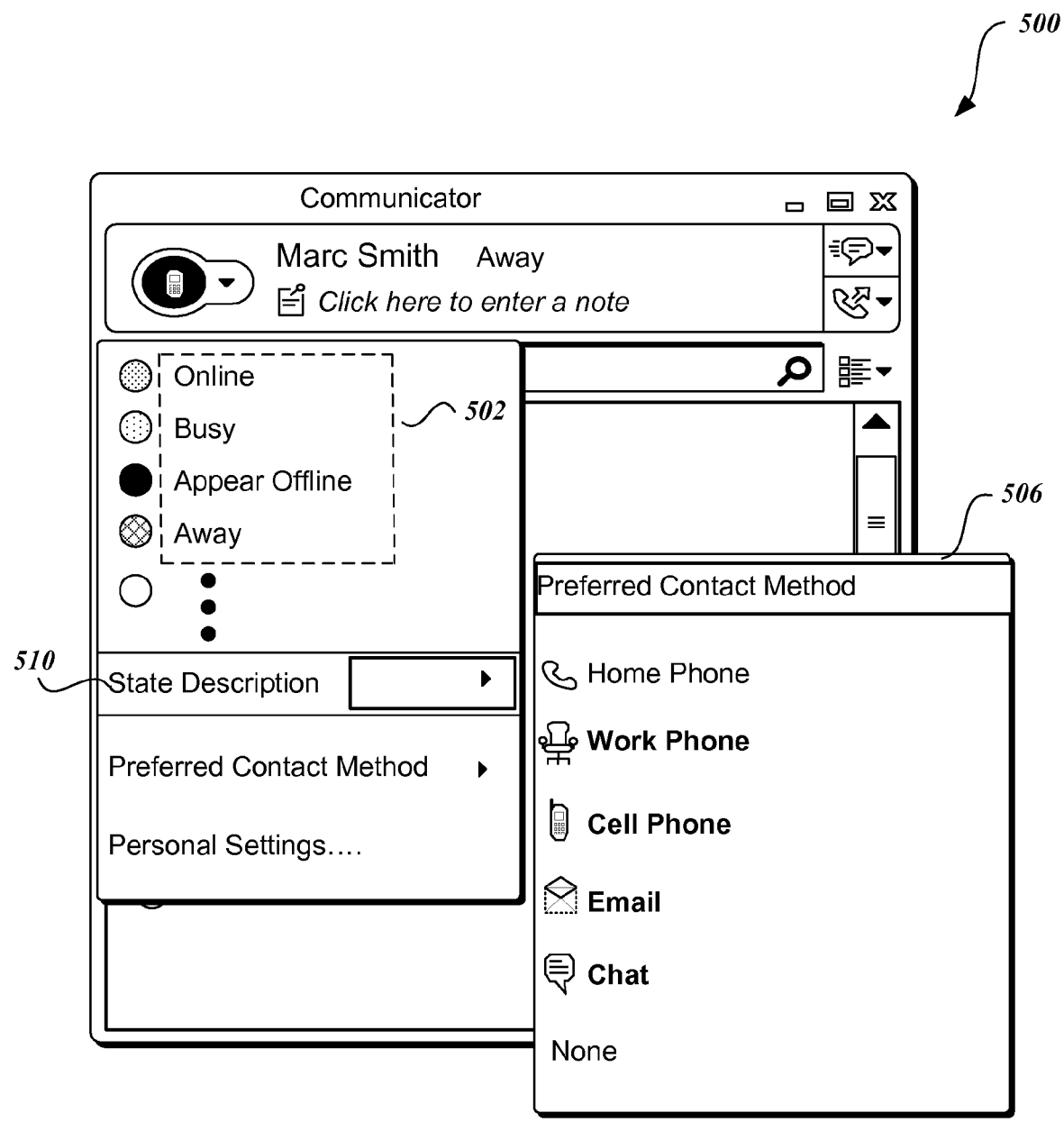
FIG. 5 is a pictorial diagram of the exemplary screen that displays options while a user inputs preference information in accordance with an aspect of the present invention.

Referring to FIG. 5, an exemplary screen 500 displays menu options for a user to enter a current activity, presence state, preferred communication method or other user profile information. As shown, the user may be given several predefined words 502 to choose from for describing a current activity or state, for example, "Online," "Busy," "Away," and "Appear Offline." Further, the user can actively input the presence information (e.g., state description) indicating the current activity or presence state, in conjunction with a preferred method at State Description Box 510. For example, the user can enter a short message, such as "No Calls," "Talking with Someone," "Do not Disturb," "Call in Sick," etc., which is to be presented to a potential recipient as the current presence state or current context of the user. The integrated communication server 110 may identify most frequently used messages and present them to the user as part of menu selections. As shown in a preferred contact method menu 506, a user can indicate that one or more preferred methods are desired. After the user indicates preferred methods, the integrated communication server 110 stores the user preferred method as part of the user profile information and updates publications of presence information to reflect the user preferred methods.

Figure 6:
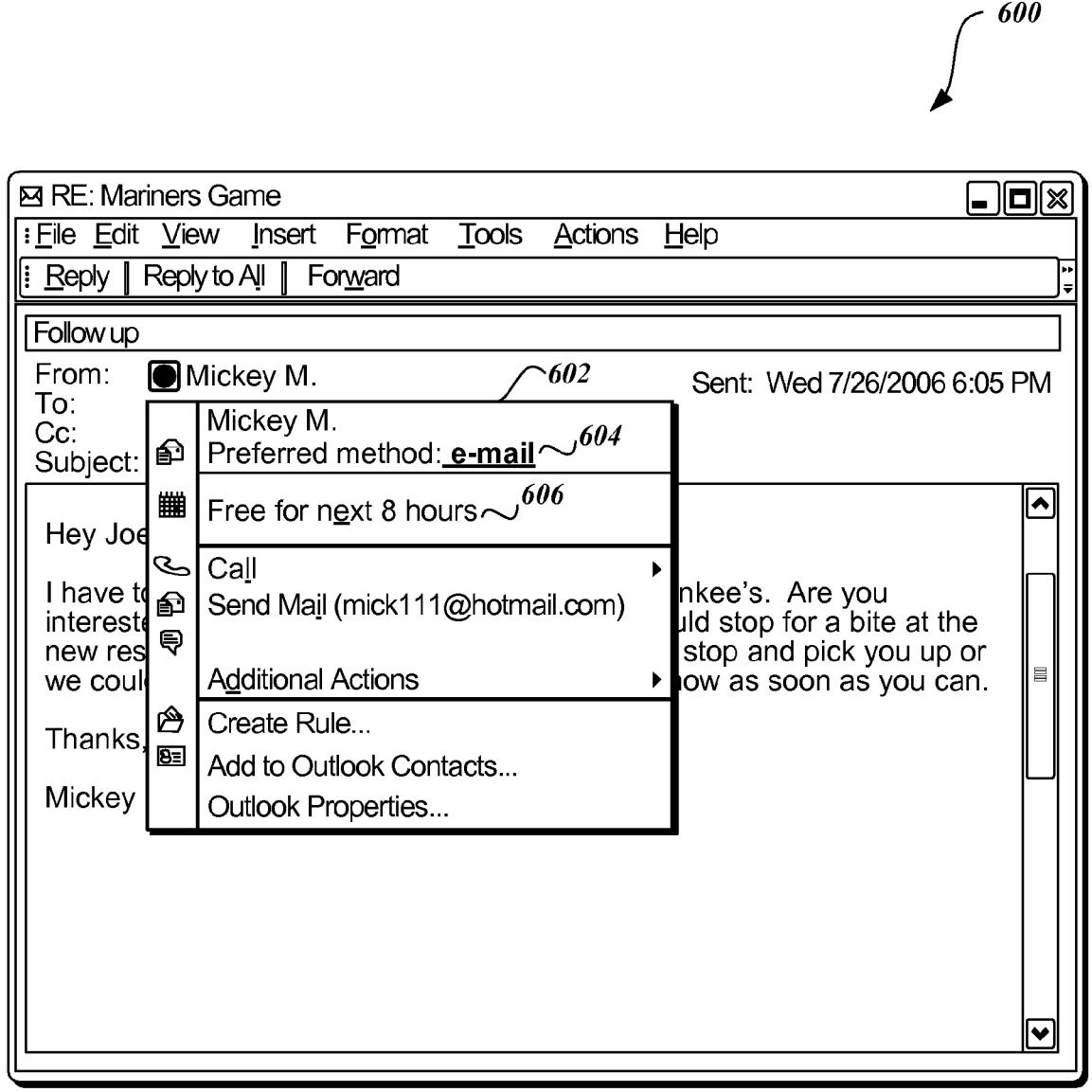
FIG. 6 is a pictorial diagram of the exemplary screen that publishes user presence information embedded in an email application in accordance with an aspect of the present invention.

As will be appreciated by one of ordinary skill in the art, the preferred method(s) and the current state information can be presented and directly activated in many conventional communication applications as long as the application can embed and present the preferred method and the current state information to a user. For example, an email application may embed the presence information as shown in FIG. 6. Assume that a user wants to reply to an email received from a friend "Mickey." The user can view Mickey's presence information 602 within the email window 600. As shown in the email window 600, the publication of presence information 602 is embedded, including a preferred communication method 604, present state 606, and other presence information. In this example, the user can activate an email communication with Mickey by clicking a hyperlink associated with "email" 604 within the email application window 600. Further, based on the publication of presence information 602, the user may activate other available communication methods listed within the publication of presence information 602. The publication of presence information 602 also indicates that Mickey will be available for receiving communications from the user for next eight hours.

Figure 7:
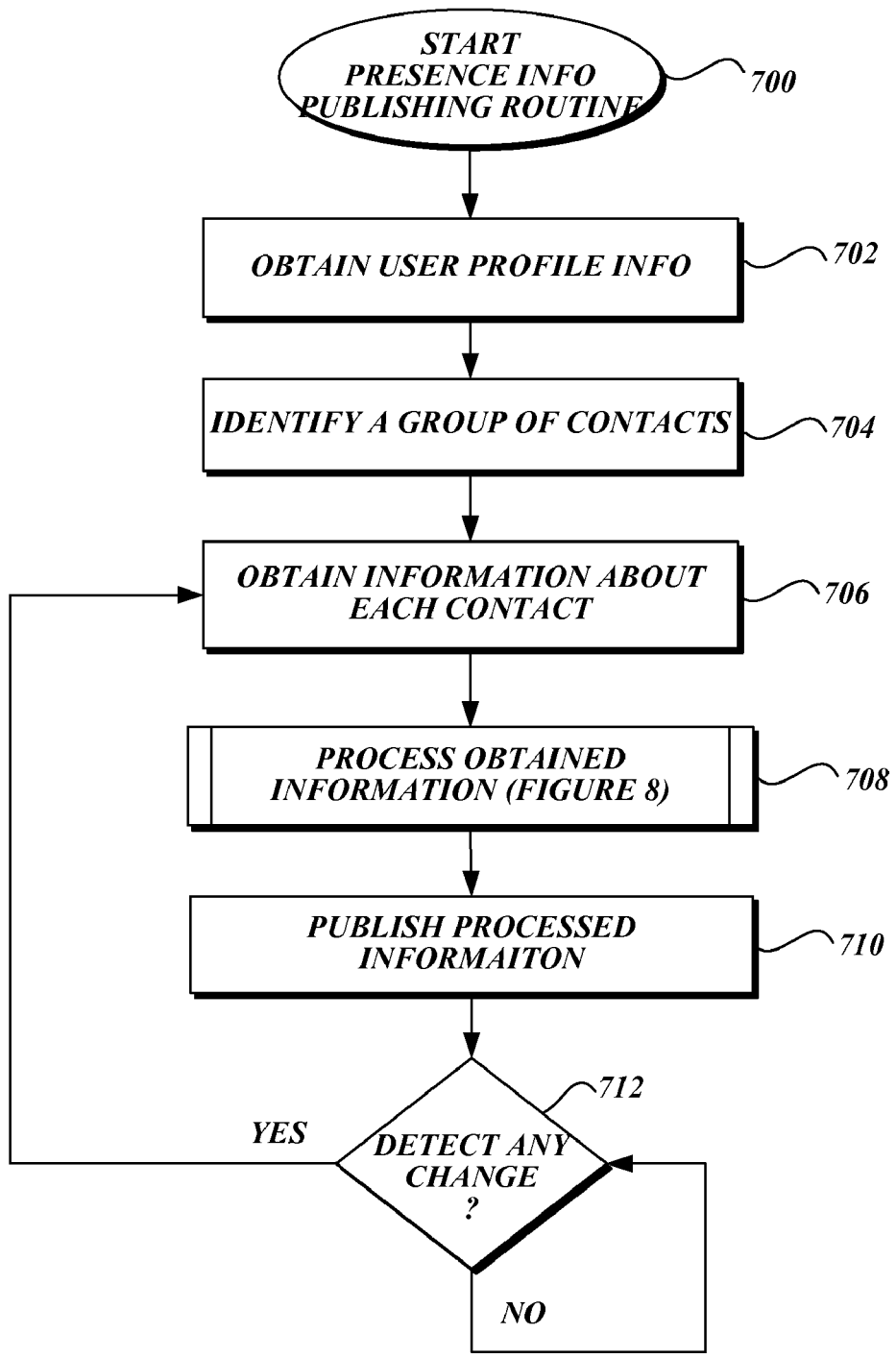
FIG. 7 is a flow diagram illustrating a presence information publishing routine for dynamically publishing user presence information of a potential recipient for a communication in accordance with embodiments of the present invention.

FIG. 7 is a flow diagram 700 of a presence information publishing routine for dynamically publishing the user presence information of a potential recipient for a communication in accordance with the present invention. For the purpose of discussion, assume that each user of the integrated communication server 110 has specified a group of potential recipients (contacts) with whom the user will communicate. The preferred communication method, etc. have been specified within the user profile information stored in the database 112. Assume further that when a user starts requesting integrated communication service from the integrated communication server 110, the information about the user may be obtained in order to identify contacts and collect presence information of the contacts.

Beginning at block 702, the user profile information of a user may be obtained from the database coupled to the integrated communication server 110. At block 704, a group of contacts may be identified. As discussed above, the user may have previously specified a group of contacts who can communicate with the user via the integrated communication server 110. Likewise, the group of contacts also indicated that the user can communicate with them. Based on the user profile information, the integrated communication server 110 may identify a group of contacts. Further, the integrated communication server 110 may identify a group of contacts via interaction with the user. The user can simply add a contact on the fly as the user wants to communicate with the contact. In one embodiment, the integrated communication server 110 may search a group of contacts available for a certain communication method within the networked environment 100. In another embodiment, a group of contacts may be identified within other communication applications such as an email application, instant messenger application, calendar application etc., or other service servers.

At block 706, each contact's presence information is collected and/or retrieved. While some part of the presence information which is already stored in the database may be retrieved, some other part of the presence information may be directly collected from a contact, or a device of the contact, including, but not limited to, the contact's activity, the contact's interaction with the integrated communication server 110, the location of the device, and contact's distance from the device, accessibility via diverse communication methods, etc.

At block 708, the collected and retrieved information about the contacts may be processed to be suitable for publishing the presence information of the contacts on a user device via a subroutine 800. Alternatively, the collected and retrieved information about the contacts may be processed to be suitable for a particular conventional communication application such as an email application. At block 710, the processed information about the contacts is published to the user and enables the user to activate one or more communication methods to communicate with each contact. At decision block 712, a determination is made as to whether any changes are detected in the contacts' presence state or in the group of contacts. For example, if the user may add a new contact, there is a change in the group of contacts. Likewise, if a contact indicates changes in the current presence state, there is a change in the contacts' presence state.

If no change is detected at decision block 712, the routine 700 returns back to decision block 712, monitoring any changes in the contacts' presence information, in the group of contacts, etc. In one embodiment, the server 110 will track and aggregate relevant shifts (changes) in the contact's presence state. For example, the server 110 will track a contact's activity by monitoring how much the contact has used the mouse, keyboard, stylus or other input device on the device in a predetermined time frame. If the contact does not use the input device within the predetermined time frame, the contact's activity may change from "Online" to "Inactive." For another example, the server 110 will track the contact's activity by monitoring whether the contact is in communication with others via the server 110. If the user is currently communicating with others, the user's activity may change to from "Online" to "Busy." As mentioned above, each contact can actively input the current state or activity in order to publish the inputted presence state to other users.

If any change is detected at decision block 712, the routine 700 returns to block 706 and repeats above mentioned steps. As discussed above, if the server detects a change, the server 110 will dynamically update the presence information of the contact and reflect the update on the published presence information of the contact. In one embodiment, upon updating the published presence information of the contact, the visual effect may be used to alert the user about the changes in the presence information of his/her contacts. For example, a visual indicator representing a current state of the contact, such as an icon, may blink or change its color.

In one illustrative embodiment, the integrated communication server 110 may utilize a set of rules for dynamic mapping of user preferences to specific aggregated presence state in order to determine a preferred communication method or a best available communication method as the user's presence information changes in real time.

Figure 8:
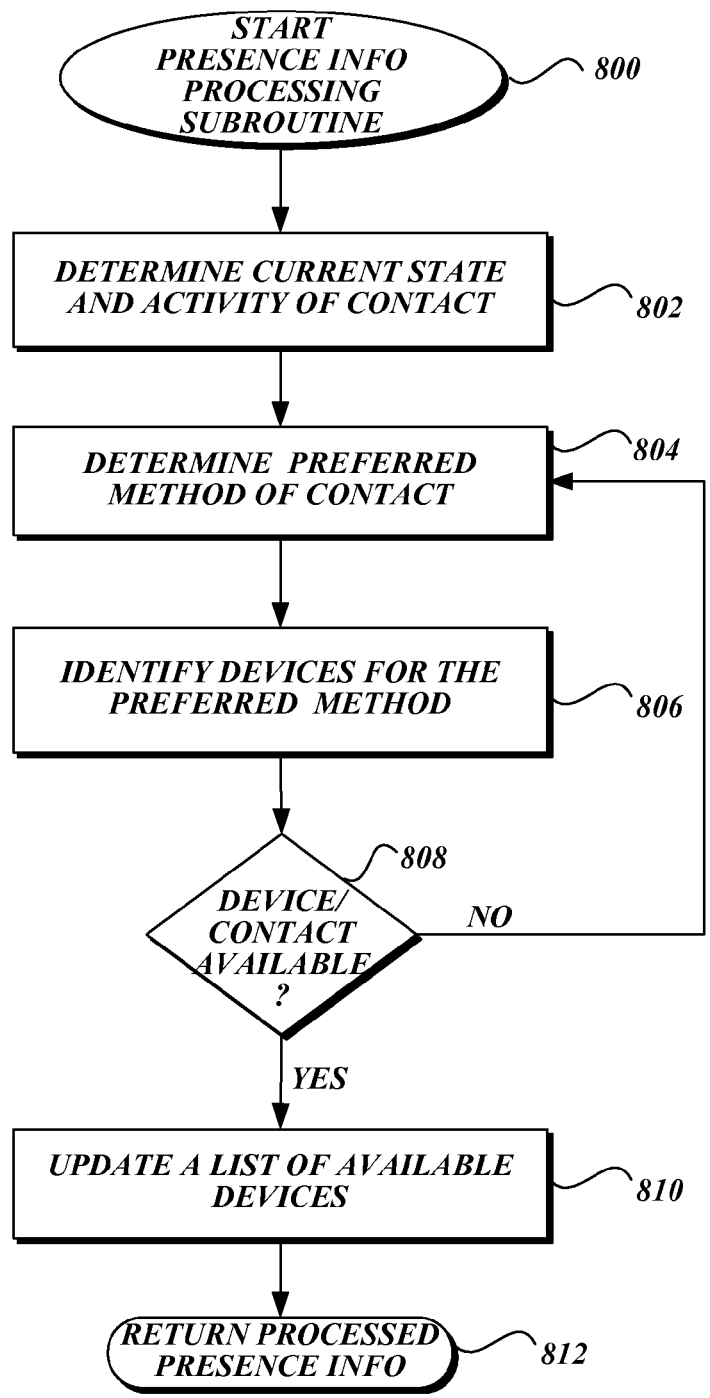
FIG. 8 is a flow diagram illustrating a presence information processing subroutine utilized by the location awareness routine in FIG. 7.

FIG. 8 is a flow diagram 800 of a subroutine for processing the collected presence information in accordance with an embodiment of the present invention. As with the routine 700, a contact's user profile information is retrieved to extract a preferred method, available devices, contact information, etc. Further, current state information may be collected from a contact or a device of a contact in real time or in near real time.

At block 802, a current presence state of the contact is determined based on the collected information. If there is any conflict between the collected and retrieved information with respect to the current presence state of the contact, the integrated communication server 110 may have a set of rules to resolve such conflicts to determine the current presence state of the contact. For example, the set of rules indicate that the contact's user profile information is used if there is a conflict between the contact's user profile information and collected information. In this example, if the contact is currently online but the contact has specified that his/her state is "Appear Offline," the user specified state ("Appear Offline") will be used instead of the collected current presence state ("Online").

At block 804, the contact's preferred method may be determined. As mentioned above, a set of rules may be utilized for determining one or more preferred communication methods based on the user's preference and current presence state. For example, the integrated communication server 110 may have rules specifying that if the contact has explicitly identified a preferred method within the user profile information, such method will be used as long as the contact is accessible via the preferred method. The integrated communication server 110 may have rules specifying that if the recipient did not explicitly identify a preferred method within the user profile information, or the recipient is not accessible via the preferred method, the server 110 may analyze the presence information to determine several available communication methods at a given time and under given circumstances. In one embodiment, the server 110 may suggest the best available communication method among several available communication methods. For the purpose of discussion, assume that a contact is currently offline and has indicated that the contact does not want to be disturbed, without specifying any preferred method. Based on the information, the server 110 may determine that an asynchronous communication (such as email communication) may be the best available communication method to reach the contact under the current situation and context. It is to be noted that the aforementioned example is depicted for illustrative purposes only. The set of rules for determining the preferred method can be defined and updated, as appropriate, within the integrated communication server 110. It is to be noted that the server may consider several preferences such as user preference, organizational preference, server defined preference, etc., to determine preferred communication methods. In one embodiment, the presence level for a contact may also be considered to determine preferred communication methods for the contact and the scope of the present information to be displayed to the contact.

At block 806, a device suitable for each preferred communication method may be determined. In some instances, a contact may specify the preferred communication method that indicates (implicitly or explicitly) preferred device information for activating the specified preferred method. For example, if the preferred communication method is "Cell only," a mobile phone associated with the contact will be determined. For another example, if the preferred communication method is "No Calls," but the user's current state indicates that the user is currently online, the instant message communication may be determined as the available communication method and, consequently, a device which can display an instant message application window may be determined. Further, availability of the device or the contact may be determined as illustrated at decision block 808. Even if the contact has specified the preferred communication method, the preferred communication method may not be activated as the contact initially indicated because the contact is not currently available (accessible) via the preferred communication method. For example, there are some instances where the contact has specified that the preferred communication method is an instant message, but the contact is not available for exchanging instant messages since the contact is currently offline. If the device or the contact is not currently available, the routine may return to block 806. If the device and the contact are currently available, at block 810 a list of available devices may be updated to include the device. In one embodiment, the server may enable the user to communicate with the contact via the available device by activating the preferred communication method. The subroutine 800 returns the processed presence information (the preferred communication method, the list of available devices, current state and activity of the contact, etc.) and completes at block 812.

One skilled in the art will recognize that the aforementioned embodiments are described for illustrative purpose only, and thus, are not to be construed as limiting. Moreover, although specific screen displays and an exemplary flow diagram implemented by the integrated communication server 110 are illustrated, it should be understood that the examples provided are not exhaustive and do not limit the present application. For example, it is contemplated that any suitable application including, but not limited to, productivity applications, portals, and communication applications supported by a centralized server may determine an available or preferred communication methods for each contact and enable the user to launch the preferred communication method via a direct action on the application. It is further contemplated that user preferences may be collected in different communications contexts/situations. For example, when a user indicates that the current state is "in a meeting," the user preference may be inferred as a mobile phone, email, IM, SMS, etc.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for publishing presence information about a group of recipient parties when a sending party initiates a communication channel with one or more recipient parties, the method including:
    obtaining a user profile of a sending party from a database;
    generating a list comprising at least one recipient party based on the user profiled of the sending party;
    obtaining information through a communication server about the recipient party including presence information and user profile of the recipient party;
    processing the obtained presence information to extract current state information and communication preferences of the recipient party;
    generating a presence information publication according to the processed presence information and communication preferences, the presence information publication including an identifier of the recipient party, a preferred communication method of the recipient party for initiating a communication channel between a sending party and the recipient party and the extracted current state information of the recipient party; and
    providing the presence information publication on a display device to the sending party.

2. The method of claim 1, further comprising:
    detecting a change in the information about the recipient party; and
    upon detecting a change, dynamically updating the presence information publication to reflect the change.

3. The method of claim 1, wherein generating a publication includes determining several communication choices available to initiate a communication channel between the sending party and the recipient party.

4. The method of claim 3 further comprising determining, for each of the several communication choices, a level of likelihood of successfully communicating with the recipient party.

5. The method of claim 4 wherein the ordered list of communication choices is determined based on the level of likelihood of successfully communicating with the recipient party.

6. The method of claim 4, further comprising:
    selecting from the determined several communication choices a preferred communication choice with a highest level of likelihood of successfully communicating with the recipient party; and
    presenting the preferred communication choice to the sending party in a first level and a list of alternative communication choices selected from the determined several communication choices in a second level, the list of alternative communication choices being presented in an order according to the determined likelihood of successfully communicating with the recipient party.

7. The method of claim 3 wherein the level of likelihood is determined based on determination factors about the recipient.

8. The method of claim 7 wherein the determination factors include at least one of modality preference, communication channel preference, device preference, functionality of device, availability of device, activity of the recipient party, or current presence state of the recipient party.

9. The method of claim 1, further comprising:
    receiving the sending party's indication to select a communication choice from the ordered list of communication choices; and
    upon reception of the sending party's indication, initiating the communication channel with a recipient in accordance with the selected communication choice.

10. A computer-readable medium having computer-executable components that when executed by a processor assist a user in determining a preferred communication modality for communicating with a recipient, comprising:
    a storage component configured to store and update information about the recipient;
    a process component configured to obtain a user profile of a sending party, to generate a list comprising at least one recipient party based on the user profiled of the sending party, to obtain information about the recipient party through a communication server including presence information and user profile of the recipient party, to extract current state information and communication preferences of the recipient party from the obtained presence information to generate a presence information publication according to the processed presence information and communication preferences, the presence information publication including an identifier of the recipient party, a preferred communication method of the recipient party for initiating a communication channel between a sending party and the recipient party and the extracted current state information of the recipient party; and
    a user interface component for providing the presence information publication on a display to the sending party.

11. The computer-readable medium of claim 10, further comprising:
    a tracking component for collecting user presence information from the recipient, aggregating user presence information and monitoring changes in the user presence information of the recipient, wherein the set of communication preferences is updated in accordance with the changes in the user presence information of the recipient.

12. The computer-readable medium of claim 10, wherein the processing component determines several communication choices available to initiate a communication channel between the sending party and the recipient party and determines, for each of the several communication choices, a level of likelihood of successfully communicating with the recipient party, and the user interface component presents the presence information publication according to the determined likelihood of success in reaching the recipient.

13. The computer-readable medium of claim 10, wherein a preferred communication modality is determined from the set of communication preferences.

14. The computer-readable medium of claim 13, wherein as the user selects the preferred communication modality, the user interface component provides a corresponding user graphic interface to assist the user to communicate with the recipient.

15. The computer-readable medium of claim 10, wherein the user interface component presents a description about the aggregated user presence information.

16. The computer-readable medium of claim 10, wherein the process component applies a set of rules to determine one or more communication preferences, and wherein the set of rules dynamically maps the recipient's preference and a recipient's current state.

17. The computer-readable medium of claim 10, wherein the user interface component provides a visual indicator associated with a communication preference from the set of communication preferences; and wherein the visual indicator associated with the communication preference is configured to initiate a communication channel connection with the recipient as indicated by the communication preference.

18. A method for determining a preferred communication modality, the method comprising:
   collecting current state information about a user from a user database;
   obtaining user preference information which is specified by the user;
   generating a list comprising at least one recipient party based on the user preference information;
   obtaining information about the recipient party through a communication server including presence information and user profile of the recipient party;
   processing the obtained presence information to extract current state information and communication preferences of the recipient party;
   comparing the extracted current state information of the recipient party, communication preferences of the recipient party and the user preference information to identify a first preferred communication modality;
   identifying a device capable of implementing the first preferred communication modality and displaying the identification of the capable device on a display to the user;
   determining accessibility of the recipient party via the identified device and the first preferred communication modality; and
   upon determining the accessibility of the recipient party, enabling the recipient party to communicate with the user via the first preferred communication modality and the identified device.

19. The method of claim 18, wherein if there is a change in the current state information of the recipient party, the accessibility of the recipient party is determined again based on the change.

20. The method of claim 18, further comprising:
   if the recipient party is not accessible via the first preferred communication modality, identifying the second preferred communication modality;
   determining accessibility of the recipient party via the identified device and the second preferred communication modality; and
   upon determining the accessibility of the recipient party, enabling the recipient party to communicate with the recipient party via the second preferred communication modality and the identified device.

\* \* \* \* \*